United States Patent Office 3,502,729
Patented Mar. 24, 1970

3,502,729
PROCESS FOR THE PREPARATION OF TRIORGANOBORON COMPOUNDS
Antonio Salvemini and Giovanni Cuneo, Milan, and Franco Smai, Novate Milanese, Milan, Italy, assignors to Montecatini Edison S.p.A., Milan, Italy, a corporation
No Drawing. Filed Feb. 2, 1967, Ser. No. 613,416
Claims priority, application Italy, Feb. 3, 1966, 2,296/66
Int. Cl. C07f 5/02
U.S. Cl. 260—606.5        5 Claims

ABSTRACT OF THE DISCLOSURE

Process for the preparation of organoboron compounds of the general formula $BR_3$, wherein R is an alkyl, aryl, cycloalkyl or aralkyl radical, for using in catalysts for the polymerization of vinyl compounds in organic synthesis, etc., by reacting the components of a Grignard reagent of the general formula R.Mg.X, where R is the aforementioned radical and X is a halogen from the group of chlorine, bromine and iodine, with a polyborate boron derivative of the general formula $(R'O)_3B \cdot nB_2O_3$ (where R' is an alkyl radical having a straight or branched chain containing from 2 to 6 carbon atoms, a phenyl, an alkyl substituted-phenyl or phenyl-substituted alkyl, and $n$ is a number equal to or upwards of 1, but preferably less than 2). This Grignard reagent is prepared from a RX type compound and a suspension of magnesium in an inert organic hydrocarbon solvent containing only catalytic quantities of an ether such that the molar ratio of ethers to the RX compound ranges substantially from 0.01 to 0.5. The magnesium may be activated with small quantities of ethyl iodide prior to its incorporation in the suspension. The polyborate boron derivative is prepared according to a method which foresees the esterification of partially dehydrated polyboric acids in an inert organic hydrocarbon, according to our copending application Ser. No. 571,706. The reaction of formation of Grignard derivative and the reaction of this latter with the polyborate boron derivative take place simultaneously giving thus rise to the $BR_3$ boron compounds. The reaction is carried out at a temperature of rrom 80° to 180° C.

SPECIFICATION

Our present invention relates to a process for the production of organoboron compounds containing direct bonds between the carbon of an organic radical (R) and the boron atom (B), such compounds having the general formulate $BR_3$, wherein R may be an alkyl, aryl, cycloalkyl and aralkyl radical.

It has already been proposed ot prepare organic boron compounds of the triorganoboron type, i.e. compounds of the general formula $BR_3$, by reacting a Grignard reagent of the general formula $R \cdot Mg \cdot X$, where R is an organic radical and X is a halogen such as chlorine, bromine or iodine, with boron compounds such as boron halides, alkyl borates or boron-oxide-containing substances. In fact, such a system is described and claimed in the commonly assigned copending application Ser. No. 422,027 filed Dec. 29, 1964, now U.S. Patent No. 3,397,241 by two of the present joint applicants. In a later application, Ser. No. 527,762 of Feb. 16, 1966, also copending herewith and commonly assigned, it was pointed out that it is possible to react an alkyl derivative having the general formulat $R \cdot X$, where R is an alkyl, an aryl, a cycloalkyl or an aralkyl group and X is a halogen, with a suspension of magnesium metal in an organic hydrocarbon solvent with a boron derivative in the presence of, at most, catalytic quantities of ether. The reaction there is carried out at a temperature preferably ranging between 80° and 180° C. and advantageously within the more limited range of 100° C. and 150° C. The R·X compound is most advantageously an alkyl, aryl or cycloalkyl halide having 2 to 6 and even 7 carbon atoms in the carbon chain. Thus, halogenated catenary (e.g. ethyl, propyl, butyl, pentyl and hexyl) halides with straight (linear) configuration or with branched chains, cyclohexyl halides and aromatic halides (halobenzenes) yield the best results. Of the halogenated aryl compounds, the most suitable for the purpose of the application Ser. No. 527,762, appear to have been the chlorobenzenes and bromobenzenes. Suitable reactants, however, also included benzyl bromide and benzyl chloride, cyclohexyl chloride and the like. In general, the halide group of the RX-type compound was chlorine, bromine or iodine. For the present purposes the compound RX may be any of those of these aforementioned copending applications.

The boron derivatives used in last process were preferably chosen from the group of boron trichloride, boron trifluoride, boron-trifluoride adducts with organic compounds containing a highly electronegative atom (e.g. $BF_3 \cdot O(C_2H_5)_2$, alkylborates such as methylborate $B(-OCH_3)_3$, and reaction products of boron oxide ($B_2O_3$) and boron halides or organoesters of boric acids).

While the latter process has been found to be most satisfactory for the production of trialkylborons, a substantial problem arises in such systems as well as in conventional systems in which preparation of the Grignard reagent prior to the reaction was required, namely, that one or more of the components and often the Grignard compound (which constitutes a separate phase), must be prepared individually and then used in the reaction. The result is an increased reaction time, the need for large quantities of ether (without which conventional Grignard reagents cannot be prepared), the need for substantial precautions to avoid explosion or other dangers arising from the inflammability of the reaction system containing large quantities of ether, and the previous preparation and recovery of relatively expensive boron compounds which are not readily available on the market.

It is thus the principal object of the present invention to extend the principles originally set forth in the aforementioned copending applications and provide a process for the preparation of organoboron compounds of the $BR_3$-type which is technologically less complicated, can be carried out with shorter reaction times, does not need preparation of the various components, and is comparatively inexpensive.

These objects and other which will become apparent hereinafter are attained, in accordance with the present invention, with a process based upon our surprising discovery that a specific class of organo-esters of boric acid, when reacted in an inert organic solvent with a "Grignard component" consisting of at least two substances capable (in the presence of excess ether) of forming an active Grignard reagent of the general formula $R \cdot Mg \cdot X$, produces triorganoborons whose radical is identical with that of the Grignard component in spite of the fact that a relatively minor quantity of ether is present in the system and then only in catalytic amounts. The particularly advantageous boron-containing component of this invention is a polyborate ester having the general formula $(R'O)_3B \cdot (B_2O_3)n$ or $(R'O)_3B \cdot n(B_2O_3)$, where R' is selected from the group which consists of alkyl radicals having from 2 to 6 carbon atoms, phenyl radicals and substituted-phenyl radicals, the polyborate ester being prepared generally as described in the commonly assigned copending application Ser. No. 571,706 of Aug. 11, 1966, filed by one of the present joint inventors. The reaction set forth in that application for the preparation of polyborate esters is advantageously carried out in an inorganic liquid in which the polyborate ester is distributed and combined with the Grignard component to effect the synthesis of the triorganoboron.

Basically, the polyborate esters are prepared by suspending an inorganic boron acid (containing boron, oxygen and hydrogen) in an inert organic liquid, heating the resulting suspension at a temperature between 80° and 200° C. to partly dehydrate the boron acid and form a polyboric acid therefrom, and thereafter esterifying the polyboric acid by reacting it in the organic liquid with an organic compound containing at least one hydroxyl group and the organic radical R' of the aforementioned formula; the organic compound thus employed is preferably an aliphatic alcohol having from 2 to 6 carbon atoms, phenol or a substituted phenol. In this process, the organic liquid should have a boiling point above that used in the dehydrating step and may be selected from diethylbenzene, xylene, ethylbenzene, p-cymene, dipentane, n-nonane, n-decane, decalin, ethylpropylbenzene, propylbenzene, butylbenzene, cyclohexane, chlorobenzene, chlorocymene and benzyl chloride.

The two substances capable of forming a Grignard reagent and thus constituting the Grignard "component" of the present invention when introduced into the reaction vehicle, preferably include a halocarbon having the general formula $R \cdot X$, where R represents a hydrocarbon radical (such as alkyl, aryl, cycloalkyl or aralkyl radical) and X represents a halogen from the group of chlorine, bromine and iodine. The single-stage reaction is carried out by combining this substance ($R \cdot X$) with the other substance capable of forming the Grignard reagent, namely, finely divided magnesium, and the boron-containing compound as described, as distributed in the organic liquid, simultaneously in an inert organic vehicle forming the reaction system, the reaction being carried out at temperatures between 80° C. and 180° C.

The $R \cdot X$-type compounds of this invention, which may be drawn from a wide variety of alkyl, aryl, aralkyl and cycloalkyl halides, are preferably halogenated derivatives of aliphatic hydrocarbons with a straight or branched chain and containing from 1 to 6 carbon atoms, cyclohexylhalides, and aryl or aralkyl halogenated derivatives such as bromobenzene, chlorobenzene, benzyl chloride and benzyl bromide.

As indicated earlier, the polyboric esters having the general formula $(R'O)_3B \cdot n(B_2O_3)$ may be prepared as described in the copending application Ser. No. 571,706 from orthoboric acid and alcohols or phenols so as to contain an R' group which is an alkyl radical containing from 2 to 6 carbon atoms, a phenyl radical or substituted-phenyl radical; n is a number greater than or equal to 1 but preferably less than 2. Such compounds, also known as boroxines when n equals 2, are the reaction product of the partly dehydrated boric acid and the alcohol or phenol which yield a solution or suspension in the inert organic medium in which the reaction is carried out. According to one important feature of this invention, the solution or suspension thus obtained is used directly as the boron-containing component of the improved reaction system.

The overall reaction has, surprisingly, been found to be substantially more economical than those obtained from more expensive boron compounds, and even more surprisingly to be of relatively high yield by comparison with the quantity of boron present in the initial reaction mixture. Furthermore, all dangers of explosion and fire are avoided and control of the reaction is carried out with considerable ease.

In the process of this invention, the magnesium suspension may be prepared by adding metallic magnesium to the inert solvent in the presence of catalytic quantities of the ether described above. The organic compounds most desirable for the present purposes as the reaction vehicle include substantially all organic compounds having a boiling point above the reaction-temperature condition, i.e. above 80° C. and preferably from 80° to 180° C.

Among the most effective inert organic solvents for this purpose of the present invention are those which may be used simultaneously for the preparation of the polyborate component in accordance with application Ser. No. 571,706, these solvents including diethylbenzene, xylene, ethylbenzene, para-cymene, dipentene, n-nonane, n-decane, decaline, ethylpropylbenzene, propylbenzene, butylbenzene (iso, normal or tertiary). Most effective are, of course, diethylbenzene, decaline and like compounds which are capable of suspending or dissolving the polyborate compounds and esters prepared in accordance with the aforementioned application.

The magnesium substance of the "Grignard component" may be activated by small quantities of ethyl iodide before reaction of the Grignard component with the polyborate component and preferably before combination of this substance with the $R \cdot X$-type compound of the Grignard component. The ether is used in exceptionally small and catalytic quantities such that only traces may be required for promoting the reaction; preferably, the molar ratio of ether to the $R \cdot X$-type compound should range between 0.01 and 0.5. While any ether suitable for use in conventional Grignard reagents may be employed for the purposes of the present invention, it has been found that ethyl ether and di-n-butyl ether are the most effective and practical. The reaction can be carried out advantageously by suspending or dissolving a polyborate in the organic inert hydrocarbon liquid in which it is formed, while metallic magnesium shavings, the ether and another quantity of the same organic liquid are placed in a reaction vessel and heated to a temperature of about 100° C. Thereafter, the $R \cdot X$-type compound may be added in solution in the same organic solvent with or separately from the polyborate component prepared in the manner described. The $R \cdot X$-type substance and the polyborate component are added to the magnesium suspension at a rate designed to maintain the reaction temperature between 80° and 180° C. The triorganoboron compounds are then distilled from the reaction mixture.

The invention is illustrated hereinbelow with reference to a number of specific examples illustrating the best mode presently known to us for carrying the invention in practice (the polyborates used in the following examples are prepared as described in application Ser. No. 571,706 of Aug. 11, 1966):

EXAMPLE I 108 grams (4.5 moles) of magnesium shavings were put into a 4 liter reactor, fitted with a stirrer, a thermometer, a gas-inlet pipe and a submerged-outlet dropping funnel. The reactor was flushed with nitrogen and 66.5 grams (0.9 mole) of ethyl ether, 5 ml. of ethyl iodide and 1200 ml. of diethylbenzene (a mixture of three isomers) were introduced into the reactor. Stirring was begun and the mixture heated to a temperature of 100° C.

When this temperature was attained, we slowly dripped a mixture of 290 grams (4.5 moles) of ethyl chloride and 450 ml. of a solution of $(C_2H_5O)_3B \cdot nB_2O_3$ (prepared in accordance with application Ser. No. 571,706) (ethyl polyborate with $1 < n < 2$) in diethylbenzene (boron content of this component=36 grams/liter) into the reactor. During the addition of the boron-containing component to the Grignard-forming substances, the temperature of the reaction mixture showed a tendency to rise and therefor the rate of admixture was so regulated as to keep the temperature around 110° C.

When combination of the reactants was completed the reaction mass was held for a further 1 hour at the temperature of 110° C.

The reaction mixture was then subjected to distillation under a nitrogen stream and the fraction boiling at 95° C. was collected. 116 grams of $B(C_2H_5)_3$ were obtained with a yield calculated on the boron initially introduced into the system of 79%.

EXAMPLE II

With a reactor similar to the one of the preceding example, a suspension of 108 grams of magnesium in 1200 ml. of diethylbenzene was prepared, and 66.5 grams of ethyl ether and 5 ml. of ethyl iodide were added thereto.

After having raised the temperature of the suspension to 100° C., a mixture consisting of 490 grams of ethylbromide (4.5 moles) and 450 ml. of a solution of the ethyl polyborate (prepared in accordance with application Ser. No. 571,706) of the preceding example, was slowly dripped into the vessel with stirring. The addition was carried out such that the temperature of the reaction mass was maintained between 100° C. and 110° C. When combination of the reactants was completed the reaction mass was held for a further 1 hour at the temperature of 110° C. The triethyl boron thus formed was separated from the reaction mass by distillation, under a light nitrogen flow.

The yield of triethyl boron calculated with respect to the starting quantities of boron was 83%.

EXAMPLE III

Into a reactor having a capacity of 750 liters and fitted with a stirrer, temperature-measuring and control means, gas-feed pipes and with an immersed-end dropping funnel, 21 kg. of crude magnesium in crystalline form (865 moles), 250 liters of diethylbenzene and 20 liters (192 moles) of ethyl ether were introduced.

This mixture was then heated with stirring to a temperature of 70° C. Thereupon, at a rate of 50–60 liters/hr., the polyborate component (prepared in accordance with application Ser. No. 571,706) was fed into the reactor; the added mixture consisted of 68 liters of ethyl chloride and 85.5 liters of a solution of ethyl polyborate in diethylbenzene having a boron titer of 36.8 grams/liter. The addition of the mixture was carried out such as to maintain the temperature between 90° and 100° C. After the addition of the reactants, the reaction mixture was held for another hour at a temperature of from 90° to 100° C.

Afterwards, the reaction mixture was distilled under a light nitrogen stream and, by collecting the fraction boiling at 94°–96° C., 24.18 kg. of $B(C_2H_5)_3$ were obtained corresponding to a yield, with respect to the starting quantities of boron, of 84.6%.

EXAMPLE IV

Into a 1000-ml. reactor, similar to that described in Example I, a Grignard component was introduced which was constituted by 18 grams of magnesium shavings (0.75 mole), 11.2 grams of ethyl ether (0.15 mole), 1 ml. of ethyl iodide and 200 ml. of diethylbenzene. This mixture was heated, with stirring, to 150° C. and a mixture consisting of 118 grams (0.75 mole) of bromobenzene and 62.6 grams of a solution of ethyl polyborate in diethylbenzene (boron content of 4.31% by weight and a ratio $B/OC_2H_5=1.014$) (prepared in accordance with application Ser. No. 571,706) was slowly dripped into the reactor.

Triphenylboron was obtained with a yield of 68% with respect to the starting quantity of boron.

EXAMPLE V

With the same operational procedures and equipment used in Example IV, 1 ml. of ethyl iodide and 11.2 grams of ethyl ether, a mixture of 106 grams of $C_4H_9Br$ and 64.3 grams of a solution of ethylpolyborate in diethylebenzene (prepared in accordance with application Ser. No. 571,706) having a boron titer of 4.2% by weight and a ratio $B/OC_2H_5=1.15$, were dripped into a suspension of 18 grams of magnesium in 200 ml. of diethylbenzene. Keeping the reaction temperature of about 140° C., tributylboron was obtained with a yield of 75% with respect to the starting quantities of boron.

EXAMPLE VI

With the same operational procedures and equipment used in Example IV, a mixture of 89 grams of chlorocyclohexane and 73.5 ml. of a solution of ethyl polyborate in diethylbenzene boron titer 36.8 grams/liter; $B/C_2H_5O$ ratio=1.42 (prepared in accordance with application Ser. No. 571,706) was reacted with a suspension of 18 grams of magnesium in 200 ml. of diethylbenzene, 11.2 grams of ethyl ether and 1 ml. of ethyl iodide.

The temperature was maintained at about 140° C. for the course of the reaction. Boron-tricyclohexane was formed with yield of 70% with respect to the starting quantity of boron.

EXAMPLE VII

The reaction was carried out according to the operational procedure and with the same reactants as those used in Example VI, using however 128.5 grams of benzyl bromide ($C_6H_5CH_2Br$) instead of chlorocyclohexane.

The reaction was carried out at a temperature between 160° and 170° C. The yield in $B(CH_2C_6H_5)_3$ was 65% with respect to the starting quantity of boron.

EXAMPLE VIII

By operating as in the preceding examples, 108 grams of magnesium in a suspension of 1200 ml. of diethylbenzene, also containing 7 grams of ethyl ether and 5 ml. of ethyl iodide, were reacted with 490 grams of ethylbromide and 450 ml. of a solution of ethyl polyborate similar to that of Example 1 at 100° C .Triethylboron was formed with a yield calculated on the starting quantity of 77.8%.

EXAMPLE IX

Following the procedure of the preceding examples, 18 grams of magnesium suspended in 200 ml. of diethylbenzene, also containing 11.2 grams of diethylether and 1 ml. of ethyliodide, were reacted with 82 grams of ethylbromide and with a solution in diethylbenzene of butylpolyborate (prepared in accordance with application Ser. No. 571,706), having a boron titer of 4.22% by weight and a $B/OC_4H_9$ ratio=1.7.

The reaction was carried out at a temperature of 100–110° C. and triethylboron was obtained with a yield of 76%.

EXAMPLE X

Following the procedure of the preceding examples, 18 grams of magnesium suspended in 200 ml. of diethylbenzene also containing 11.2 grams of diethylether and 1 ml. of ethyliodide, were reacted with 82 grams of ethylbromide and with a solution in diethylbenzene of phenyl polyborate (prepared in accordance with application Ser. No. 571,706), having a boron titer of 4.46% and a $B/OC_6H_5$ ratio=1.73. The reaction was carried out at a temperature of 100–110° C. and triethylboron was obtained with a yield of 75%.

EXAMPLE XI

Example X was repeated but using as boron derivative ethoxy boroxine $[B_3O_3(OC_2H_5)_3]$ in form of a solution of 18 grams of boron compound in 100 ml. of diethylbenzene. The reaction was carried out at a temperature of 100–110° C. and triethylboron was obtained with a yield of 79%.

We claim:
1. A process for the production of tri-organoboron compounds of the general formula $BR_3$, wherein R represents an alkyl, aryl, cycloalkyl or aralkyl radical, comprising the step of:

reacting simultaneously in a single-stage reaction system at least two substances capable of forming a Grignard component whose organic radical is the radical R, and a boron-containing component capable of interaction with said Grignard component to form said compound $BR_3$, said boron-containing component having the general formula:

$$(R'O)_3B \cdot nB_2O_3$$

where R' is an alkyl radical of straight or branched chain and containing from 2 to 6 carbon atoms, a phenyl radical, a phenyl-substituted alkyl radical or an alkyl-substituted phenyl radical, and $n$ is a number equal at least to 1, but less than 2, said boron containing component being distributed in an inert organic liquid, said boron-containing component being a suspension formed by the steps of:

(I) suspending an inorganic boron acid containing boron, oxygen and hydrogen in the inert organic liquid in which said boron-containing component is distributed for mixture with said Grignard component;

(II) heating the suspension obtained in Step I at a temperature between 80° and 200° C. to partly dehydrate said boron acid and form a polyboric acid therefrom; and (III) esterifying the polyboric acid to Step II by reacting it in the organic liquid of Step I with an organic compound containing at least one hydroxide group and the organic radical R', the organic compound of Step III being selected from the group which consists of aliphatic alcohols having from 2 to 6 carbon atoms, phenol, and substituted phenols, the esterified product in Step III being reacted with said substances in said single-stage reaction system without recovery of said boron-containing compound from the organic liquid.

2. The process defined in claim 1 wherein said organic liquid is a substance having a boiling point above substantially 110° C. at atmospheric pressure and above that used in Step II.

3. The process defined in claim 1 wherein said organic liquid is selected from the group which consists of diethylbenzene, xylene, ethylbenzene, p-cymene, dipentene, nonane, decane, decaline, ethylpropylbenzene, propylbenzene, butylbenzene, cyclohexane, chlorobenzene, chlorocymene and benzyl chloride.

4. The process defined in claim 1 wherein an azeotropic entrainer capable of combining with water formed by esterification in Step III is mixed with said organic liquid.

5. The process defined in claim 1 wherein said ether is selected from the group which consists of ethylether and dibutylether.

References Cited
UNITED STATES PATENTS

| | | | |
|---|---|---|---|
| 3,397,241 | 8/1968 | Sma et al. | 260—606.5 |
| 2,862,952 | 12/1958 | Groszos | 260—606.5 X |
| 2,880,243 | 3/1959 | Hennion | 260—606.5 |
| 2,939,885 | 6/1960 | Perrine | 260—606.5 |
| 3,090,801 | 5/1963 | Washburn et al. | 260—606.5 X |
| 3,100,181 | 8/1963 | Ryznar et al. | 260—606.5 X |
| 3,345,418 | 10/1967 | Brown | 260—606.5 |
| 3,405,179 | 10/1968 | Wowk | 260—606.5 |

OSCAR R. VERTIZ, Primary Examiner

WERTEN F. W. BELLAMY, Assistant Examiner